(12) United States Patent
Holz

(10) Patent No.: US 10,664,613 B2
(45) Date of Patent: *May 26, 2020

(54) VIRTUALIZATION INPUT COMPONENT

(71) Applicant: Oath Inc., New York, NY (US)

(72) Inventor: Christian Holz, San Francisco, CA (US)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/284,276

(22) Filed: Feb. 25, 2019

(65) Prior Publication Data
US 2019/0188412 A1 Jun. 20, 2019

Related U.S. Application Data

(63) Continuation of application No. 15/830,462, filed on Dec. 4, 2017, now Pat. No. 10,216,956, which is a
(Continued)

(51) Int. Cl.
| | |
|---|---|
| *H04L 29/06* | (2006.01) |
| *G06F 21/62* | (2013.01) |
| *H04L 29/08* | (2006.01) |
| *G06F 17/24* | (2006.01) |
| *G06F 3/0484* | (2013.01) |
| *G06F 16/2455* | (2019.01) |
| *H04W 12/04* | (2009.01) |
| *H04W 12/06* | (2009.01) |

(Continued)

(52) U.S. Cl.
CPC ...... *G06F 21/6245* (2013.01); *G06F 3/04842* (2013.01); *G06F 16/2455* (2019.01); *G06F 17/243* (2013.01); *G06F 21/602* (2013.01); *H04L 63/08* (2013.01); *H04L 63/083* (2013.01); *H04L 63/0853* (2013.01); *H04L 63/0861* (2013.01); *H04L 63/10* (2013.01); *H04L 67/10* (2013.01); *H04W 12/04* (2013.01); *H04W 12/0608* (2019.01); *G06F 3/0481* (2013.01); *H04L 63/061* (2013.01); *H04W 12/00504* (2019.01); *H04W 12/06* (2013.01); *H04W 88/02* (2013.01)

(58) Field of Classification Search
CPC .......................... H04L 63/0853; G06F 21/6245
USPC .......................................................... 726/7
See application file for complete search history.

(56) References Cited

U.S. PATENT DOCUMENTS

2014/0122729 A1* 5/2014 Hon ........................ H04L 67/04
709/228

* cited by examiner

*Primary Examiner* — Longbit Chai
(74) *Attorney, Agent, or Firm* — Cooper Legal Group, LLC

(57) ABSTRACT

One or more systems and/or methods for storing personal information within a first device and/or for providing personal information from the first device to the second device are provided. The first device (e.g., a smartphone) may identify a user interface (e.g., a movie streaming website) populated with user specified data (e.g., a password). The user specified data may be evaluated to identify personal information of the user (e.g., a movie streaming website password). The personal information may be stored within the first device. Responsive to determining that a second device (e.g., a smart television) displays a personal information input field (e.g., a movie streaming website password input field), an input event comprising the personal information may be provided from the first device to the second device. The input event may invoke the second device to input the movie streaming website password into the movie streaming website password input field.

20 Claims, 14 Drawing Sheets

Related U.S. Application Data continuation of application No. 15/419,027, filed on Jan. 30, 2017, now Pat. No. 9,836,621, which is a continuation of application No. 14/625,213, filed on Feb. 18, 2015, now Pat. No. 9,558,367.

(51) Int. Cl.
*G06F 21/60* (2013.01)
*H04W 88/02* (2009.01)
*H04W 12/00* (2009.01)
*G06F 3/0481* (2013.01)

VIRTUALIZATION INPUT COMPONENT

RELATED APPLICATION

This application claims priority to and is a continuation of U.S. application Ser. No. 15/830,462, filed on Dec. 4, 2017, entitled "VIRTUALIZATION INPUT COMPONENT", which claims priority to and is a continuation of U.S. application Ser. No. 15/419,027, filed on Jan. 30, 2017, entitled "VIRTUALIZATION INPUT COMPONENT", which claims priority to and is a continuation of U.S. application Ser. No. 14/625,213, filed on Feb. 18, 2015, entitled "VIRTUALIZATION INPUT COMPONENT", all of which are incorporated herein.

BACKGROUND

Many users provide personal information (e.g., passwords, credit card information, shipping information, etc.) through user interfaces (e.g., webpages, applications, operating systems, etc.). In an example, a user may provide personal information to gain access to a website (e.g., the user may provide a username and/or password to access a banking website). In another example, the user may provide personal information in order to complete a transaction for a purchase from a retail application (e.g., the user may provide credit card information and/or shipping information to a computer supplier retail application). However, remembering numerous personal information entries and subsequently matching the personal information entries to a particular user interface may present a challenge and/or a burden for many users (e.g., a user may waste time trying different login credentials for a webpage; a user may waste time redundantly entering billing information into various user interfaces such as shopping websites, an app store, an online bill pay website, and/or other user interfaces; etc.). Thus, the user may elect to utilize personal information that may be vulnerable to unauthorized access by other users (e.g., the user may utilize a short and/or easy to remember password as opposed to a secure password because the simpler password is easier to remember and/or input into a user interface). Unfortunately, many devices and/or computing environments may lack adequate personal information management functionality.

SUMMARY

In accordance with the present disclosure, one or more systems and/or methods for providing personal information from a first device to a second device are provided. A virtualization input component, hosted by the first device comprising personal information of a user (e.g., a smartphone comprising a billing address and a shopping website password of the user), may be configured to establish a communication connection (e.g., a Bluetooth connection) between the first device and the second device (e.g., a smart television). The virtualization input component may advertise the first device as a virtualized input device to the second device (e.g., the smart phone may appear to the second device as a keyboard, a mouse, a touch input device, or any other input device). The virtualization input component may identify a personal information input field (e.g., a password input field) displayed by the second device. In an example, a screen capture of a user interface displayed by the second device may be obtained, such as by a camera of the first device. In an example, the screen capture may be evaluated to identify the personal information input field. The virtualization input component may generate an input event comprising the personal information (e.g., a password for the password input field). The virtualization input component may be configured to send the input event, as originating from the virtualized input device, over the communication connection to the second device. In an example, the input event may invoke the second device to fill in the personal information input field with the personal information. For example, the input event may comprise a keyboard input (e.g., a series of key commands, such as tab commands and keystroke commands, configured to select the personal information input field and input the personal information into the personal information input field as an input) and/or a paste input.

In some embodiments, the virtualization input component may be configured to identify new personal information that may be provided to other devices. For example, the virtualization input component may identify a user interface populated with user specified data (e.g., information entered in a form on a webpage by the user). The virtualization input component may evaluate the user specified data to identify personal information of the user (e.g., the user may have entered a credit card number into the form). The virtualization input component may store the personal information within a data storage object (e.g., a file or database of personal information) of the first device. In an example, the data storage object may be encrypted to create an encrypted data storage object hosted on the first device. Responsive to determining that a second device displays a personal information input field, the virtualization input component may provide the personal information to the second device as an input for the personal information input field.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware, or any combination thereof.

1. Computing Scenario

The following provides a discussion of some types of computing scenarios in which the disclosed subject matter may be utilized and/or implemented.

1.1. Networking

Figure 1:
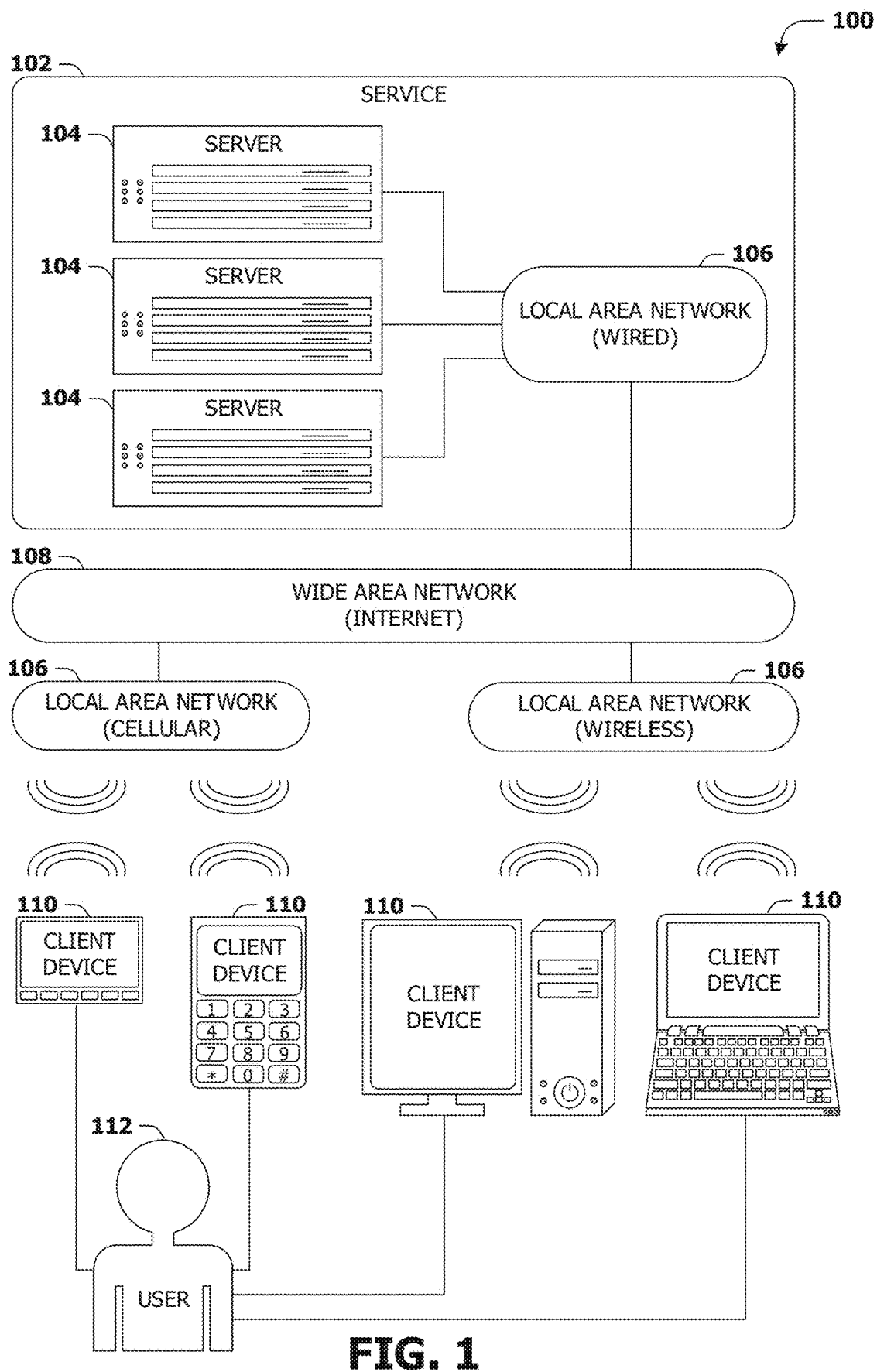
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols, and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a Wi-Fi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
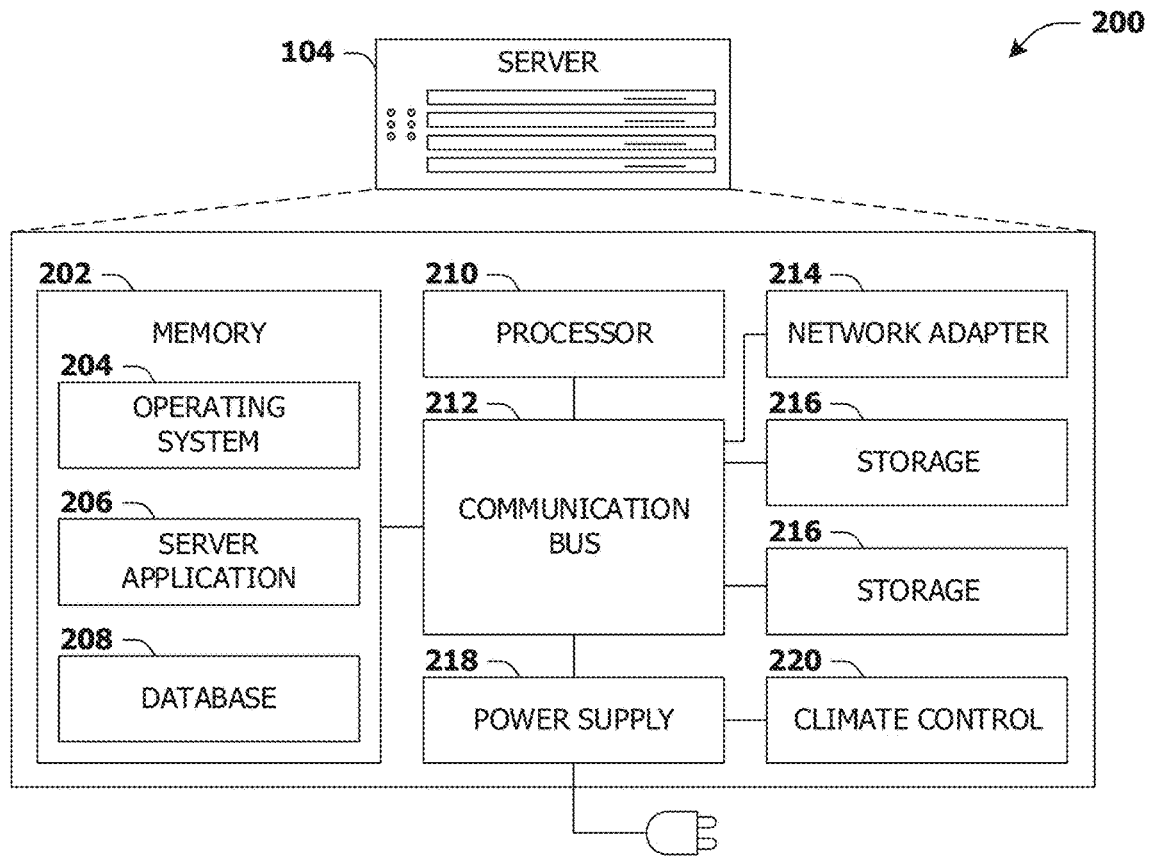
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
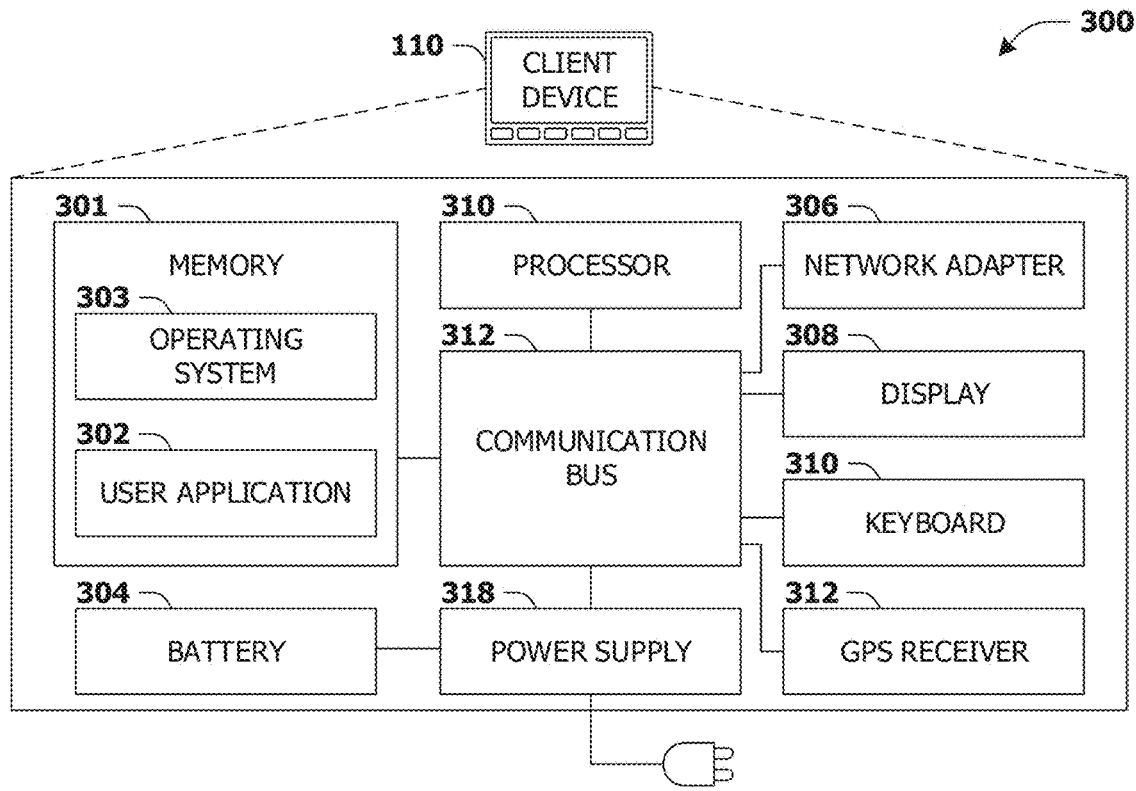
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for providing personal information from a first device to a second device and/or for storing personal information within the first device are provided. Many users utilize personal information (e.g., passwords, an address, billing information, etc.) to gain access to secure user interfaces (e.g., webpages, applications, operating systems, movie streaming services, etc.). However, keeping track of the personal information and/or identifying what personal information corresponds to which user interface presents a significant challenge and/or burden for many user (e.g., a user may waste time and/or resources attempting to identify and provide personal information that matches a particular user interface). Moreover, many devices and/or personal information managers (e.g., applications which store personal information) may lack detection techniques and/or functionality to determine what personal information to provide and how to provide the personal information to other devices. As provided herein, a user interface populated with user specified data may be identified by a first device (e.g., a smartphone may identify a billing address entered by a user into a retail website). The user specified data may be evaluated to identify personal information of the user (e.g., visual and/or textual recognition functionality may determine that the user specified data is the billing address of the user). The personal information may be stored within a data storage object that may be encrypted to create an encrypted data storage object hosted on the first device.

In an example, the personal information may be provided from the first device to a second device (e.g., a laptop, a personal computer, a tablet, etc.). A communication connection (e.g., a Bluetooth connection, a Wi-Fi connection, etc.) may be established between the first device and the second device. The first device may be advertised as a virtualized input device (e.g., a virtual keyboard, virtual mouse, etc.) to the second device. A personal information input field (e.g., an address text entry box) displayed by the second device may be identified (e.g., the personal information input field may be identified by a form field detection technique, an optical character recognition process, etc.). The virtualized input device (e.g., the first device) may generate an input event comprising the personal information, such as the billing address. The input event may be sent over the communication connection to the second device. The input event may invoke the second device to fill in the personal information input field with the personal information.

As provided herein, personal information may be stored within a first device, and may be provided from the first device to a second device. Providing users with the ability to store personal information within the first device (e.g., a personal phone carried around by a user) so that the first device may be used to provide the personal information to various other devices (e.g., a work laptop, a smart television, etc.) may reduce the amount of time spent by the user remembering personal information (e.g., the user may try multiple attempts at entering a password until the user remembers a correct password for a movie streaming service) and/or time inputting personal information (e.g., the user may be prompted to enter the password for the movie streaming service every night when the user attempts to use the movie streaming service). In this way, the user does not need to remember a plurality of personal information entries for various services and applications, waste time manually inputting the personal information entries multiple times, and/or unnecessarily expend computing resources by storing personal information on multiple devices. Security of personal information may be increased because the personal information is merely stored on a single device as opposed to being stored on a plurality of devices that may be at risk for authorized access. Accordingly, the safety, security, efficiency, functionality, and/or overall user experience may be improved by the systems and/or techniques provided herein (e.g., a reduced need to remember a plurality of personal information; an increase in the efficiency of entering personal information across multiple devices; a decrease in the likelihood of unauthorized access to personal information; a promoted use of secure passwords; etc.).

Figure 4:
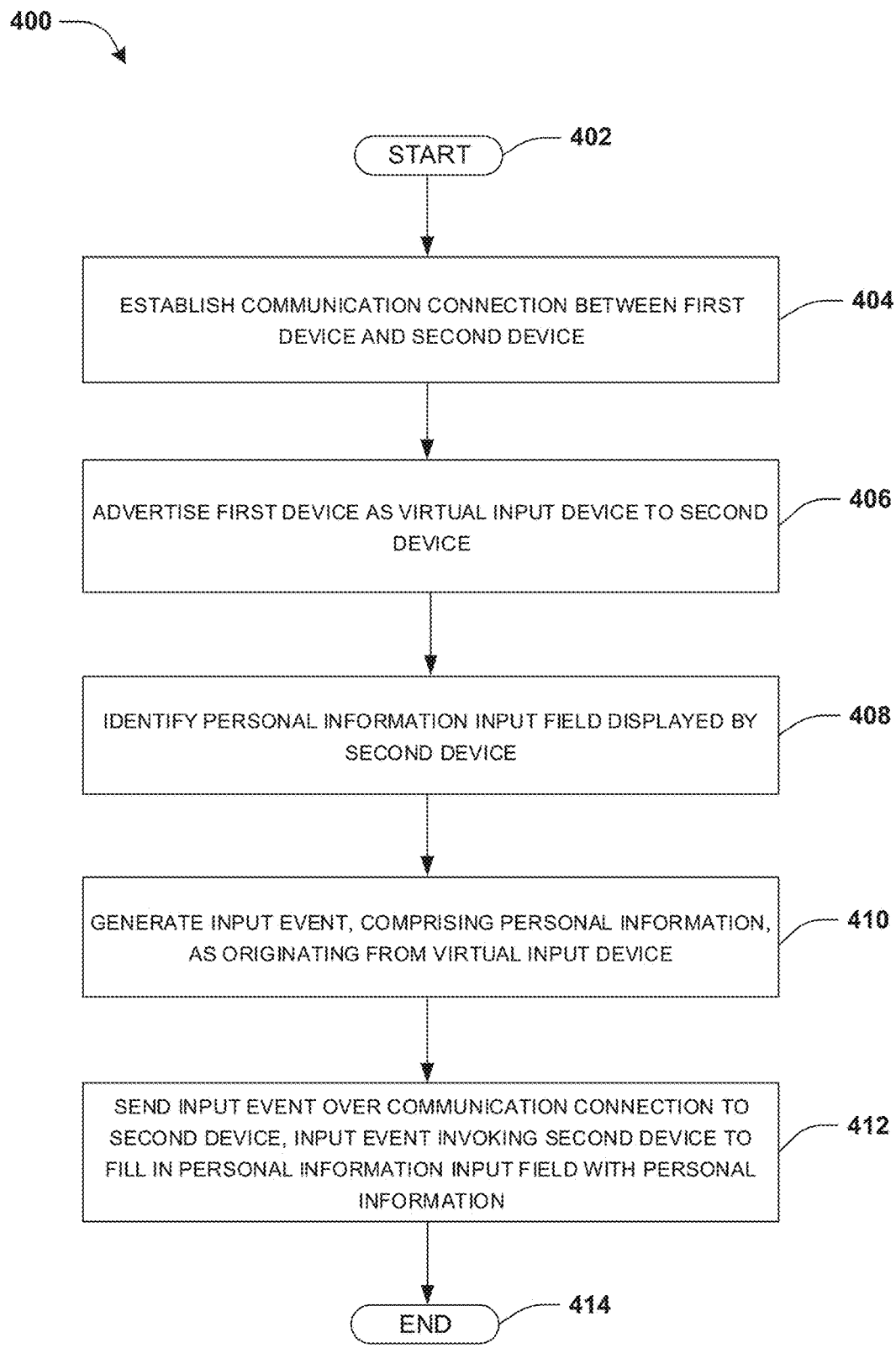
FIG. 4 is a flow chart illustrating an example method of providing personal information from a first device to a second device.

An embodiment of providing personal information from a first device to a second device is illustrated by an example method 400 of FIG. 4. At 402, the method starts. At 404, a communication connection may be established between the first device (e.g., a smartphone, a tablet, a personal digital assistant, smartwatch, a laptop, etc.) and the second device (e.g., a tablet, a laptop, a personal computer, a smart television, a smart stereo, etc.). In an example, the communication connection may comprise a Bluetooth connection, a Wi-Fi connection, a cellular communication connection, a near field connection, a radio frequency identification (RFID) connection, an inferred connection, and/or any other connection capable of facilitating communication between two devices. In an example, the communication connection may be created automatically, such as when the user enters a defined area (e.g., a room containing the personal computer) and/or has provided consent for communication with the second device. For example, responsive to the first device coming within communication range of the second device, the second device may receive a connection request. In an example, the connection request may be received as a wireless communication signal. The display device may be configured to broadcast the connection request as connectable advertising packets (e.g., adverts) using a Bluetooth protocol or other wireless protocol (e.g., Wi-Fi protocols, cellular protocols, RFID protocols, Infrared protocols, etc.). For example, a two-way wireless communication connection may be established based upon the communication request. In another example, the communication connection may be created manually based upon the first user initiating the communication request.

At 406, the first device may be advertised as a virtualized input device to the second device. In an example, the virtualized input device may be utilized as a virtual keyboard and/or a virtual mouse for the second device (e.g., the first device may appear to the second device as being a keyboard, a mouse, a touch panel, etc.). For example, the virtual input device may be configured to communicate with a keyboard controller or diver and/or a mouse controller or driver of the second device. The keyboard controller or driver and/or the mouse controller or driver may be utilized to control keyboard functions and/or mouse functions on the second device (e.g., moving a mouse cursor from a first location to a second location, entering text into an input field on the second device, etc.).

At 408, a personal information input field displayed by the second device may be identified. In an example, the personal input field may be displayed within a user interface (e.g., a webpage user interface, a mobile application user interface, etc.). The personal information input field may comprise a text entry box, a popup interface, a menu interface (e.g., a drop down menu for selecting a state, a country, an account type such as a checking account, a savings account, or a credit card account, etc.), a toggle interface (e.g., a check box, such as to provide consent to website terms and conditions), a slider interface (e.g., a sliding bar for selecting a numerical value based upon the location of the sliding bar, etc.), a console (e.g., a Unix shell, a command-line interpreter, etc.), and/or an audio/visual interface (e.g., an audio input field for providing a voice verification sample, an image input field for providing an image of the user's retina, etc.). In an example, a user interface element displayed within the user interface may be identified as the personal information input field (e.g., a text entry box). The personal information input field may comprise a password input field, a username input field, a billing information input field (e.g., a credit card input field, a billing zip code input field, etc.), a security question input field (e.g., mother's maiden name security question input field, a best friend growing up security question input field, etc.), and/or a shipping information input field.

In an example, the personal information input field may be identified from a screen capture of the second device. For example, a camera of the first device (e.g., a camera on a smartphone) may obtain the screen capture of the user interface displayed by the second device. The screen capture may be evaluated utilizing a form field detection technique to identify a user interface element within the user interface based upon a form field detection result. In an example, the form field detection result may comprise a spatial arrangement (e.g., spacing and/or location of a user interface element relative to a user interface), an input field type (e.g., a button, a checkbox, text box, etc.), a input field attribute (e.g., a size attribute, a color attribute, and/or a metadata attribute associated with the user interface element), etc. In an example, text of the screen capture may be evaluated utilizing optical character recognition to identify a context (e.g., a label for an input field, such as a username label, a password label, a shipping address label, etc.) of the user interface element. In an example, the user interface element may be identified as the personal information input field based upon the context of the user interface element and/or the form field detection result. Previous form field detection results and/or optical character recognition results may be used for identifying the personal information input field (e.g., a pizza delivery webpage may be identified from the screen capture, and previous recognition information for the pizza delivery webpage may be used to identify the personal information input field and/or a context of the personal information input field).

At 410, an input event originating from the virtualized input device may be generated. The input event may comprise personal information corresponding to the personal information input field (e.g., a password corresponding to a password input field displayed on a pizza delivery webpage). In an example, the input event may comprise cursor movement, tab input, and/or other input used to select the password input field for text entry. The personal information may be obtained from a data storage object hosted on the first device. In an example, the data storage object may have been encrypted to create an encrypted data storage object. The encrypted data storage object may comprise a plurality of personal information entries. The user may be prompted to provide master authentication credentials (e.g., a password, a fingerprint, etc.) to access the encrypted data storage object. In an example, the master authentication credentials may comprise password credentials, fingerprint credentials (e.g., a mathematical representation of the user's fingerprint), voice credentials, handwriting credentials, retinal credentials, palm credentials, DNA credentials, iris credentials, facial feature credentials, and/or any other form of authentication credentials corresponding to the user. In an example, responsive to successfully authenticating the master authentication credentials, access into the encrypted data storage objected may be obtained for retrieval of the personal information (e.g., a personal information entry corresponding to the personal information input field). In an example, the encrypted data storage object may be queried using the context (e.g., the context of the personal information input field) to identify the personal information corresponding to the personal information input field (e.g., a pizza website password context may be used to identify a password for the website). In another example, the personal information may be obtained from the user. For example, responsive to identifying the personal information input field, the user may be prompted by the first device to provide the personal information corresponding to the personal information input field (e.g., an input box, corresponding to the personal information input field identified from the second device, may be displayed by the first device). Responsive to the user providing the personal information to the first device, the personal information may be stored within the data storage object hosted on the first device for future use by the user. In an example, the user may be prompted, such as by a popup notification displayed by the first device, to provide permission to store the personal information.

At 412, the input event may be sent to the second device over the communication connection. The input event may invoke the second device to fill in the personal information input field with the personal information. In an example, the input event may comprise a mouse event, a tab event, a keyboard event, and/or other input events. For example, the tab event may comprise a tab key command configured to move the cursor forward and/or a shift/tab key command configured to move the cursor backwards. The first device to interact with the second device may utilize the mouse event, the tab event, the keyboard event, etc. The mouse event and/or the tab event may be utilized to move a cursor, displayed by the second device, to the personal information input field. In an example, the cursor may be directed from an initial location to the personal information input field based upon the spatial arrangement of the personal information input field and the initial position of the cursor. In another example, the virtualized input device may utilize the camera of the first device to identify the initial location of the cursor and direct the cursor from the initial location to the personal information input field (e.g., the camera may be utilized to monitor the movement of the cursor and make directional correction, if necessary, to move the cursor to the personal information input field). In an example, the input event may comprise a keyboard input and/or a paste input for inputting the personal information into the personal information input field.

A privacy setting for the personal information and/or a text property for the user interface element may be identified. In an example, the user may be prompted to provide a privacy setting for the personal information. The privacy setting may comprise a non-display privacy setting (e.g., signifying that the personal information is not to be displayed, such as when inputted into a user interface element) and/or a display privacy setting (e.g., signifying that the personal information is allowed to be displayed). In another example, the user interface element may be evaluated to determine a text property for the user interface element. The text property may comprise a visible text property or a hidden text property. In an example, if the personal information has a non-display privacy setting, then the personal information will not be inputted into the personal information input field if the personal information input field will display the inputted personal information (e.g., the personal information input field has a visible text property). For example, the first device may send a text input instruction to the second device. The text input instruction may invoke the second device to input a character into the personal information input field. If the personal information input field displays the character, then the personal information input field may be determined as having a visible text property as opposed to a hidden text property (e.g., the first device may capture a screenshot of the second device displaying the personal information input field in order to determine whether the character was displayed or whether a placeholder such as a dot was displayed). In an example, a previous optical character recognition result, corresponding to a previous evaluation of the personal information input field, may be evaluated to determine whether the personal information input field has the visible text property or the hidden text property. In an example, the text property and/or the privacy setting may be stored along with the personal information within an encrypted data storage object hosted on the first device. At 414, the method ends.

Figure 5:
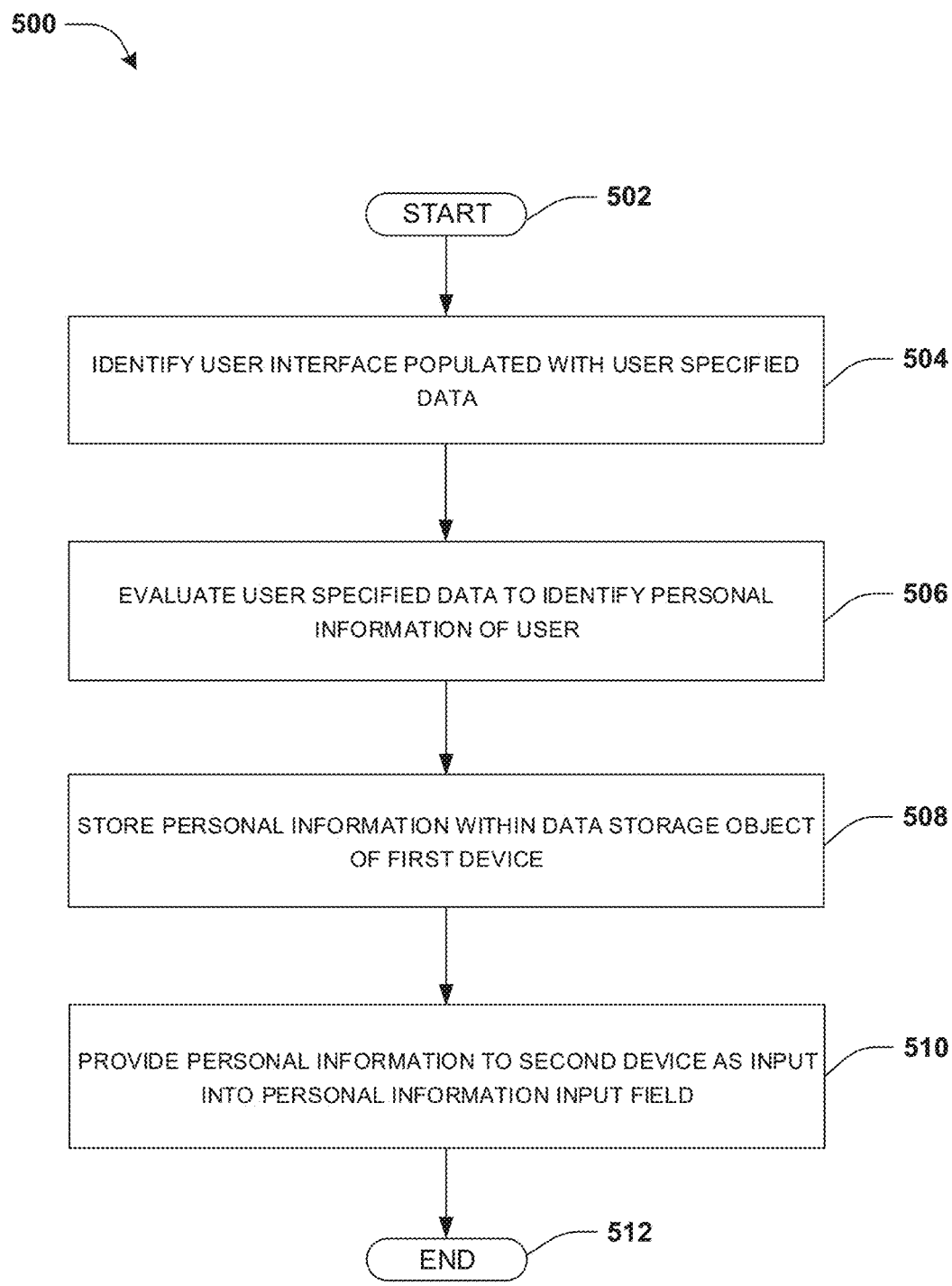
FIG. 5 is a flow chart illustrating an example method for storing personal information within a first device.

An embodiment for storing personal information within a first device is illustrated by an example method 500 of FIG. 5. At 502, the method starts. At 504, a user interface (e.g., a mobile application user interface) populated with user specified data (e.g., text corresponding to a username, a password, etc.) may be identified. In an example, the user interface may be displayed by the first device or any other device (e.g., a camera of the first device may capture imagery of the user interface displayed by a second device). In an example, the user interface may display a user interface element which may be identified as a personal information input field.

In an example, a user may populate the user interface element with the user specified data. For example, the user may input a shipping address into a shipping information user interface element within the user interface (e.g., the user may use a keyboard of the second device to input the shipping address into the shipping information user interface element displayed on the second device; the user may use the first device as a virtual keyboard to input the shipping address into the shipping information user interface element displayed on the second device; the user may use a keyboard of the first device to input the shipping address into the shipping information user interface element displayed on the first device; etc.).

In an example, the user interface and/or the user interface element may be identified from a screen capture. The user may provide consent for obtaining the screen capture. For example, a first screen capture (e.g., an image, a video, a live video feed, etc.) of a display of the second device may be obtained utilizing the camera of the first device (e.g., a camera on a smartphone). In another example, a second screen capture (e.g., a screen shot) of a display of the first device may be obtained by the first device performing a screen shot event to obtain the second screen capture (e.g., the smartphone may generate a screenshot of its own display). Responsive to obtaining the screen capture, a form field detection technique and/or optical character recognition may be performed to identify the user interface and/or the user interface element within the user interface. In an example, the user interface element may be identified as the personal information input field. For example, the user interface element may be identified as the personal information input field based upon context derived from text associated with the user interface element (e.g., a shipping information personal information input field may be identified based upon a label "input address here" near the user interface element). In another example, the user may manually identify the user interface element as the information personal information input field (e.g., the user may select an input field category element displayed by the user interface to identify the user interface element as the personal information input field).

At 506, the user specified data may be evaluated to identify personal information of the user. In an example, the personal information may comprise a password, a username, an answer to a security question, payment information (e.g., credit card information, bank information, credit account information, etc.), billing information (e.g., billing address, billing method preference information, etc.), shipping information, and/or any other user information the user may want to secure and/or store. The user may provide consent to evaluate the user specified data.

In an example, the screen capture of the user interface populated with the user specified data may be evaluated to identify the personal information, given user consent. For example, text within the personal information input field may be evaluated to identify the personal information. The text may be evaluated utilizing optical character recognition. In another example, the user may manually identify the user specified data as personal information. For example, the user may select a personal information category element (e.g., a password category, a username category, a shipping category, a non-personal information category, etc.) displayed by the user interface. The personal information category element may be used to identify a context for the user specified data within the personal information input field. Responsive to the user selecting the personal information category element, the user specified data may be identified as personal information.

At 508, the personal information may be stored within a data storage object of the first device. The data storage object may comprise a plurality of personal information entities. In an example, the data storage object may be encrypted to create an encrypted data storage object hosted by the first device. In an example, the personal information may be stored in an encrypted hash, such as an encrypted hash hosted on a processor of the first device. In an example, the encrypted data storage object may be maintained locally on the first device, which may reduce the likelihood of the personal information being accessed without authorization.

In another example, the virtualization input component may be configured to generate a secure password corresponding to the personal information input field. The secure password may be stored within the data storage object. The secure password may comprise a random set of numbers, characters, symbols, and/or letters having one or more cases. In an example, the virtualization input component may be configured to generate a second secured password in response to an expiration of a secure password time limit and/or the secure password being provided to the second device (e.g., the secure password may be updated each time the user provides the secure password to another device).

At 510, responsive to determining that a second device displays a personal information input field, the personal information may be provided to the second device as an input into the personal information input field. In an example, the user may be prompted for master authentication credentials (e.g., a password) used to access the encrypted data storage object for retrieval of the personal information within the encrypted data storage object.

In an example, a second user interface displayed by the second device may be evaluated to determine a context of the personal information input field. The data storage object may be queried utilizing the context to identify the personal information corresponding to the personal information input field. At 512, the method ends.

Figure 6A:
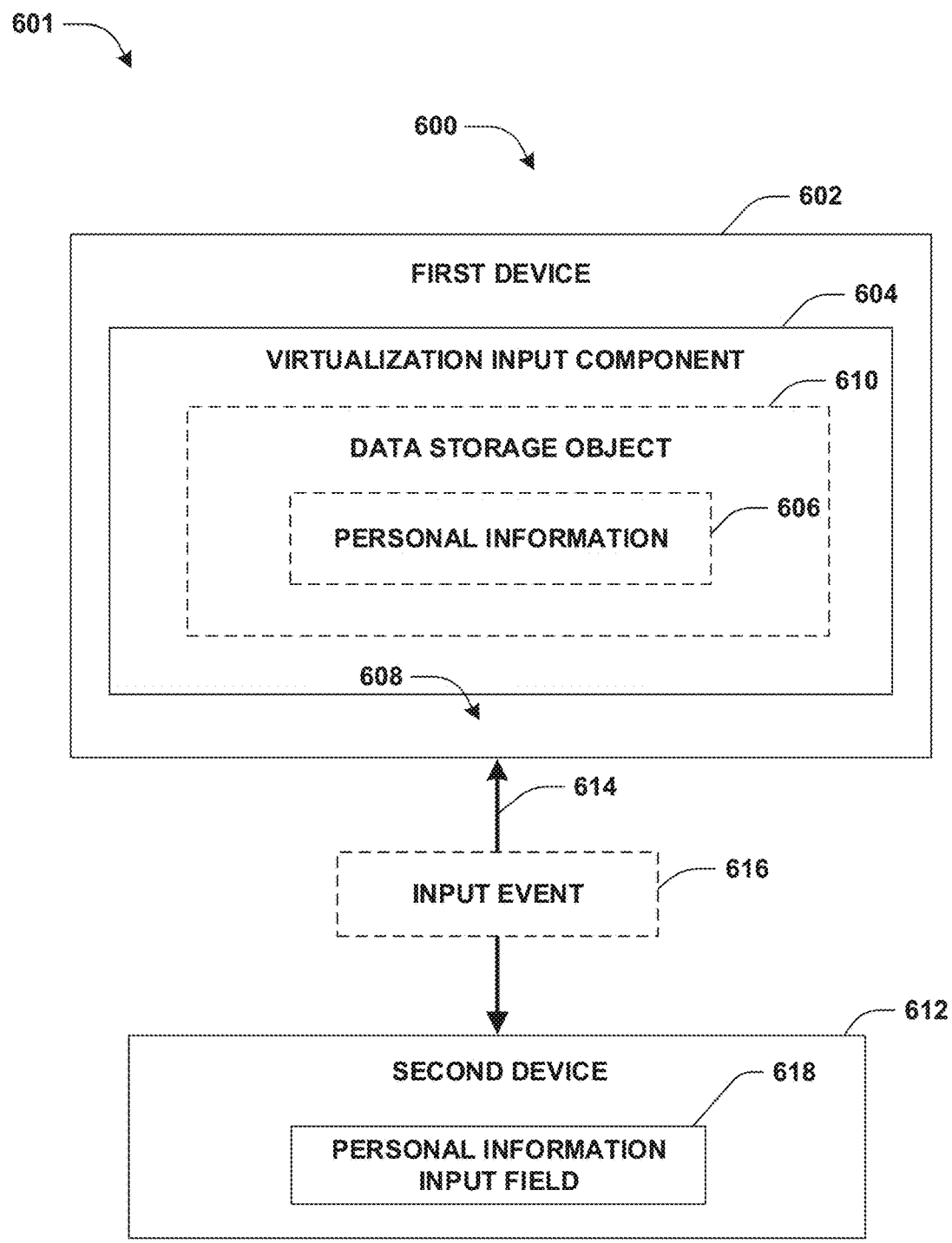
FIG. 6A is a component block diagram illustrating an example system for providing personal information from a first device to a second device.
Figure 6B:
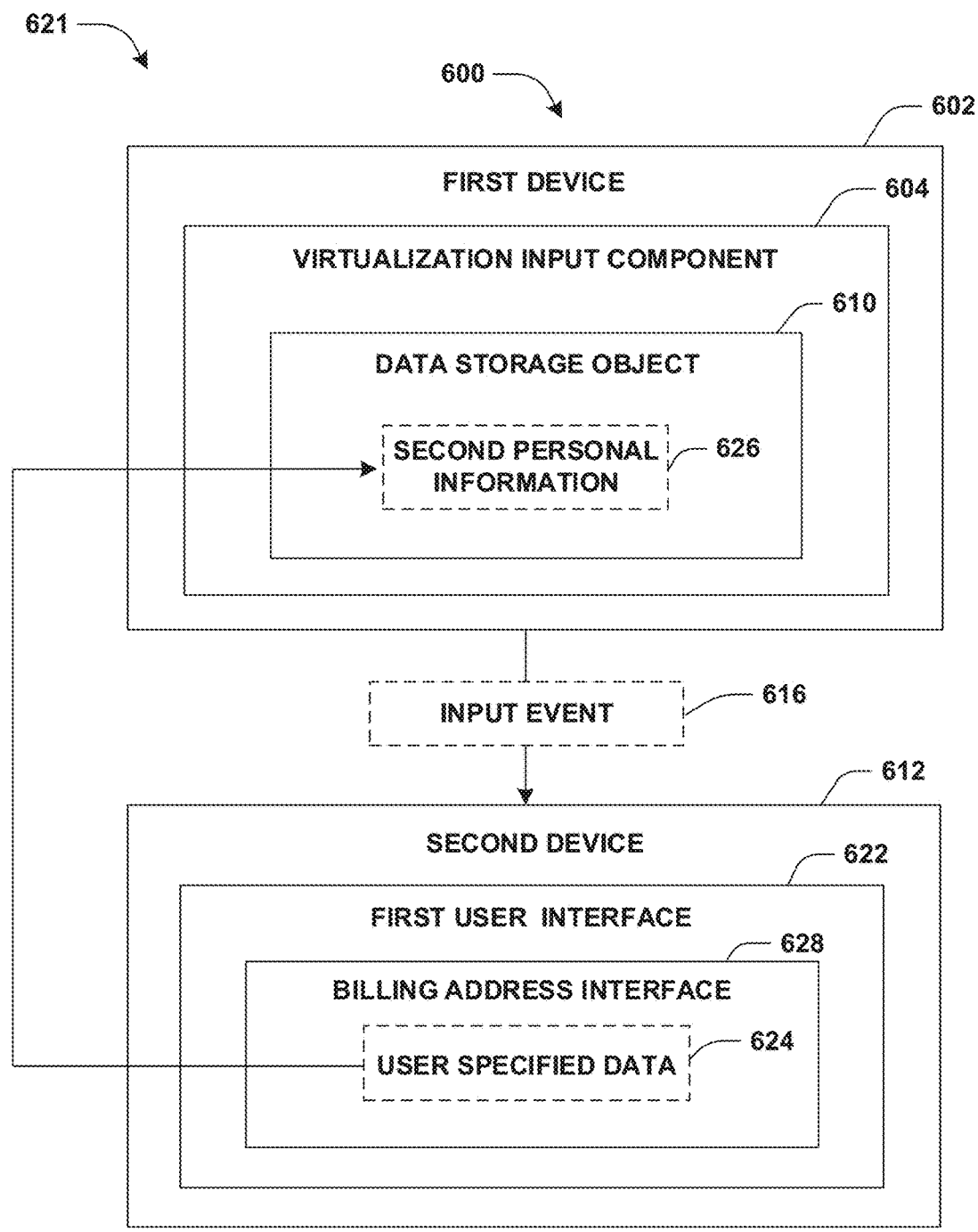
FIG. 6B is a component block diagram illustrating an example system for storing personal information within a first device, where the personal information is identified in a user interface of a second device.

FIGS. 6A-6C illustrate examples of a system 600 for providing personal information 606 from a first device 602 to a second device 612 and/or for storing personal information 606 within a data storage object 610 hosted on the first device 602. FIG. 6A illustrates an example 601 of the system 600 providing personal information 606 from the first device 602 (e.g., a smart phone) to the second device 612 (e.g., a tablet). The system 600 may comprise a virtualization input component 604 hosted by the first device 602. The first device 602 may comprise the personal information 606 of a user. In an example, the personal information 606 may be stored in the data storage object 610 hosted by the first device 602. In an example, the virtualization input component 604 may be configured to establish a communication connection 614 between the first device 602 and the second device 612. The virtualization input component 604 may advertise the first device 602 as a virtual input device 608 to the second device 612 (e.g., the first device 602 may appear to the second device 612 as a keyboard connected to the second device 612).

In an example, the virtualization input component 604 may identify a personal information input field 618 displayed by the second device 612. For example, the virtualization input component 604 may evaluate a screen capture of a display of the second device 612 to identify the personal information input field 618. Responsive to identifying the personal information input field 618, the virtualization input component 604 may be configured to generate an input event 616 comprising personal information 606. In an example, the input event 616 may appear to the second device 612 as originating from the virtualized input device 608. In an example, the personal information 606 within the input event 616 may comprise information corresponding to the personal information input field 618 (e.g., the user may have previously provided a password for a password personal information input field of a banking webpage).

The virtualization input component 604 may send the input event 616 over the communication connection 614 to the second device 612. The input event 610 may invoke the second device 612 to fill in the personal information input field 618 with the personal information 606 (e.g., the input event generated by the smartphone may invoke a cursor of the tablet to select the password personal information input field and cause the tablet to paste the password for the banking webpage into the password personal information input field).

FIG. 6B illustrates an example 621 of the system 600 storing second personal information 626 from the second device 612 within the data storage object 610 on the first device 602. The virtualization input component 604 may be configured to identify a first user interface 622 displayed by the second device 612, such as by obtaining a snapshot of the first user interface 622. The first user interface 622 may be populated with user specified data 624. In an example, the user may enter the user specified data 624 into a user interface element, such as a billing address interface 628. The user specified data 624 may be evaluated by the virtualization input component 604 to identify second personal information 626 for the user, such as a home address of the user. The personal information 606 may be stored within the data storage object 610 (e.g., an encrypted partition of a hard drive) of the first device 602. The second personal information 626 may be provided to a device for input into a personal information input field.

Figure 7A:
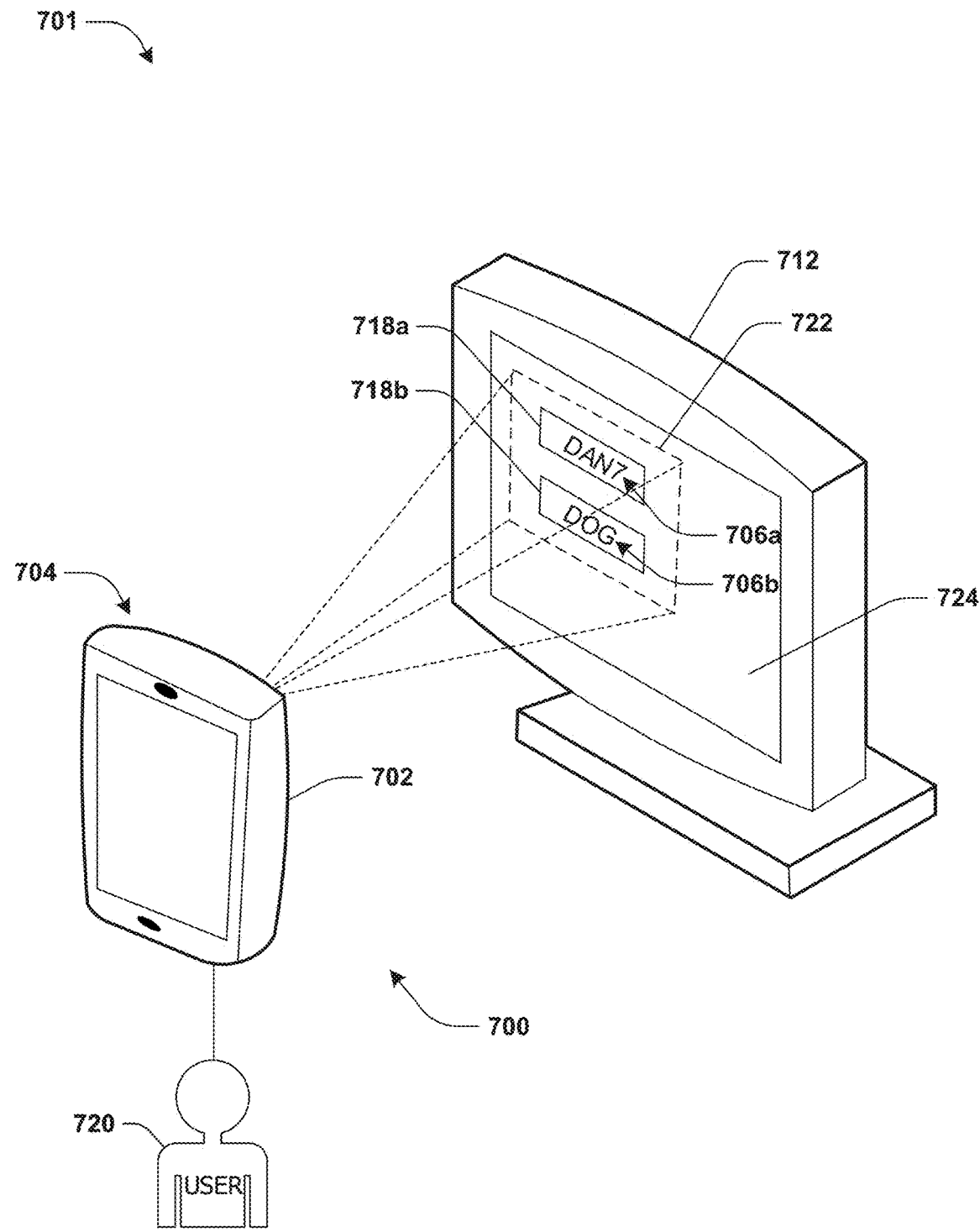
FIG. 7A is a component block diagram illustrating an example system for storing personal information within a first device, where a personal information input field has a visible text property.
Figure 7B:
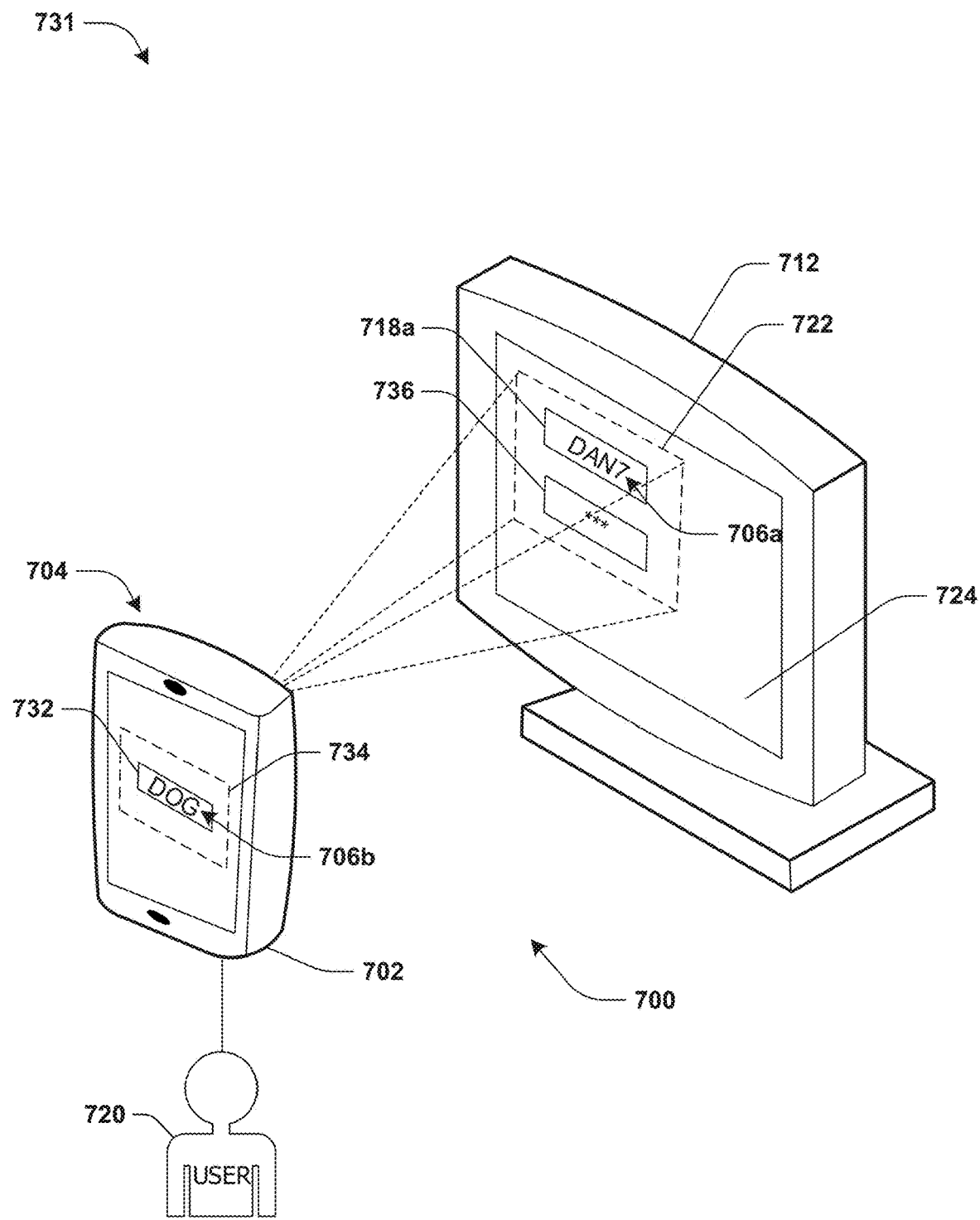
FIG. 7B is a component block diagram illustrating an example system for storing personal information within a first device, where a personal information input field has a hidden text property.
Figure 7C:
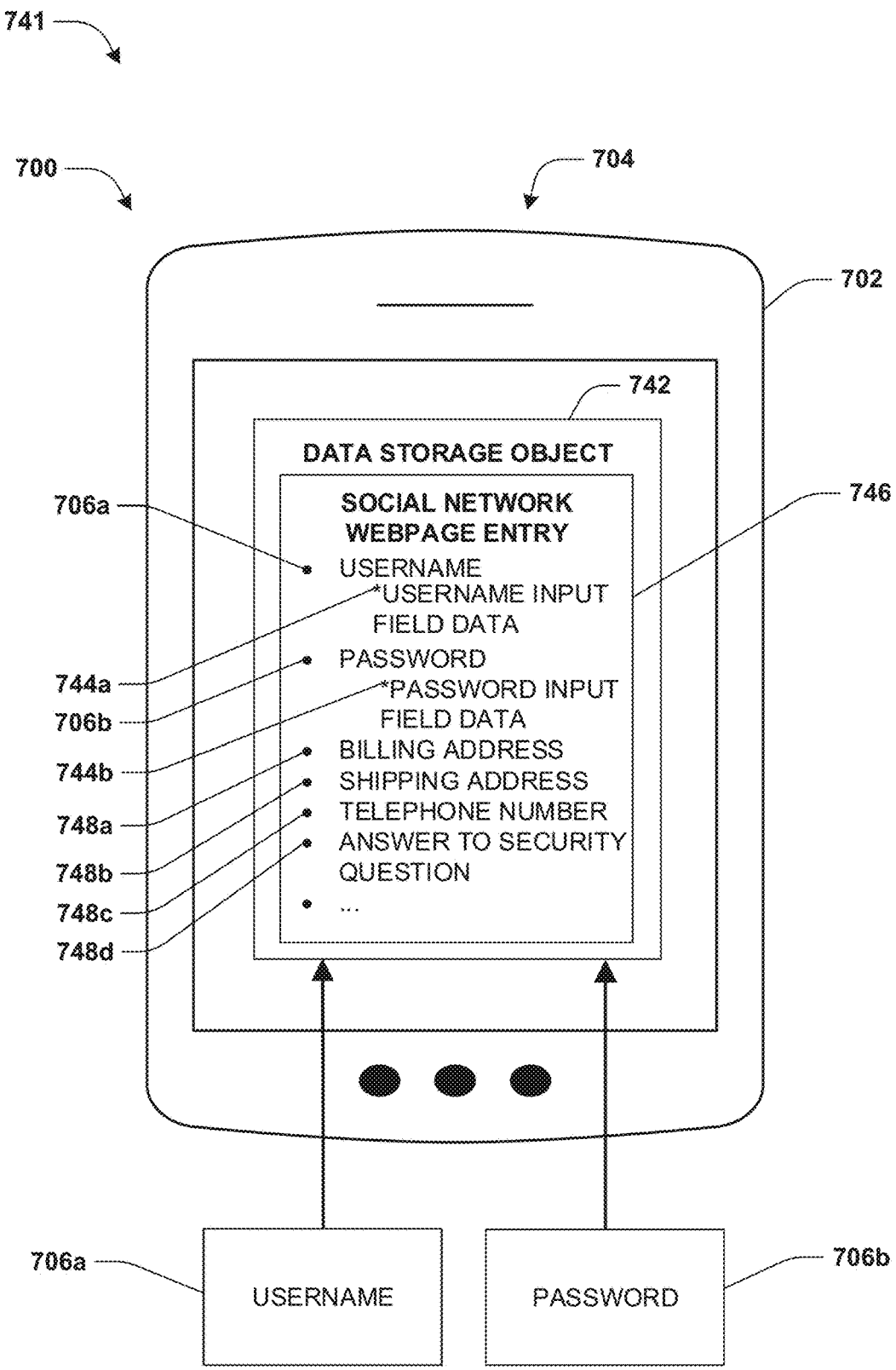
FIG. 7C is a component block diagram illustrating an example system for storing personal information within a first device, where the personal information is stored within a data storage object.

FIGS. 7A-7C illustrate examples of a system 700 for storing personal information within a smartphone 702 of a user 720. FIG. 7A illustrates an example 701 of the system 700 storing personal information, such as a username 706a and/or a password 706b, into a username input field 718a and a password input field 718b (e.g., personal information input fields) having a visible text property (e.g., text entered within the personal information input fields 718a-718b may be viewable as inputted and are not hidden). In an example, a virtualization input component 704, hosted by the smartphone 702, may identify a user interface 722 displayed by a display 724 of a personal computer 712. The user interface 722 may be identified utilizing a camera of the smartphone 702. In an example, a screen capture of the display 724 may be evaluated by the virtualization input component 704 to identify the username input field 718a and/or the password input field 718b.

In an example, user specified data provided by the user 720 may be identified within the username input field 718a and/or the password input field 718b (e.g., the text "DAN7" may be displayed within the username input field 718a and the text "DOG" may be displayed within the password input field 718b). A text property (e.g., a visual text property, a hidden text property, etc.) for the username input field 718a and/or the password input field 718b may be identified by the virtualization input component 704. In an example, the text property may be identified based upon an optical character recognition result from an optical character recognition process performed on the username input field 718a and/or the password input field 718b (e.g., a character may be input into an input field, and the input field may be determined as having the visible text property if the character is displayed or the hidden text property if a placeholder for the character is displayed). Responsive to determining that the username input field 718a and the password input field 718b have the visible text property, the user specified data may be evaluated to identify personal information, such as username 706a and/or password 706b (e.g., the text "DAN7" may be identified as the username 706a and/or the text "DOG" may be identified as the password 706b based upon the optical character recognition result). In an example, the username 706a and/or the password 706b may be stored within the smartphone 702.

FIG. 7B illustrates an example 731 of the system 700 storing the password 706b based upon a second password input field 736 having a hidden text property (e.g., text entered within the second password input field 736 is not displayed but is represented by asterisk placeholders). In an example, responsive to the virtualization input component 704 determining that the second password input field 736 has the hidden text property, a third password input field 732 corresponding to the second password input field 436 may be displayed by a second user interface 734 (e.g., a personal information input application interface) on the smartphone device 702. The user 720 may be prompted to populate the third password input field 732 with the password 706b. In an example, the third password input field 732 may be evaluated to identify the password 706b. The password 706b may be stored within the smartphone 702.

FIG. 7C illustrates an example 741 of the system 700 storing the username 706a and the password 706b within a data storage object 742. In an example, the username 706a and the password 706b may be stored within the data storage object 742 based upon the username 706a and the password 706b being associated with a user interface, such as a social network webpage. For example, the username 706a and the password 706b may be stored in a social network webpage entry 746 within the data storage object 742. In an example, additional personal information 748a-748d associated with the social network webpage may be stored within the social network entry 746 (e.g., a billing address, a shipping address, a telephone number, an answer to a security question, etc.).

In an example, input field data 744a-744b may be stored in association with the username 706a and/or the password 706b (e.g., data corresponding to at least one of a privacy setting of personal information; a visibility setting of personal information input fields such as whether the user name 706a and/or the password 706b are allowed to be input into personal information input fields having hidden or visible text properties; identification data indicative of an input field, such as context data, orientation data, text property data, spatial arrangement data, input field type and attribute data, etc. may be stored along with corresponding personal information). In an example, the input field data 744a-744b may be utilized to match the username 706a and the password 706b to corresponding personal information input fields, such as instances of the username input field 718a and/or the password input field 718b, illustrated in FIGS. 7A-7B.

Figure 8:
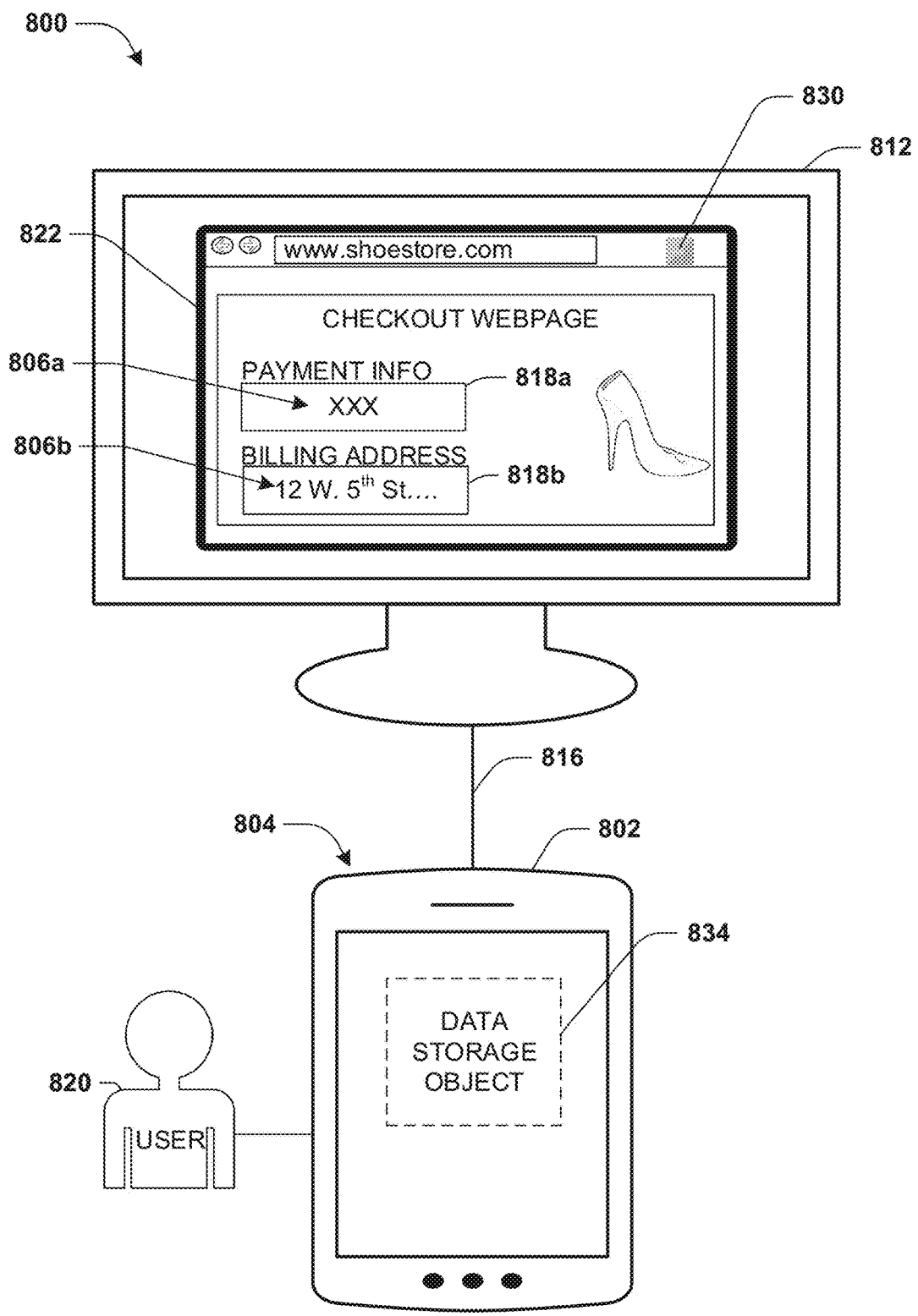
FIG. 8 is a component block diagram illustrating an example system for storing personal information within a first device, where the personal information is stored in response to a user selecting a send user interface element.

FIG. 8 illustrates an example of a system 800 for storing personal information 806a-806b within a tablet 802 in response to a user 820 selecting a send user interface element 830. In an example, a shoe store webpage user interface 822 may be displayed by a personal computer 812. The shoe store webpage user interface 822 may display personal information input fields, such as a payment information input field 818a and a billing address input field 818b. The user 820 may input personal information, such as payment information 806a (e.g., a credit card number, a credit card expiration data, a credit card security code, etc.) and/or billing address information 806b (e.g., an address associated with credit card information) into the personal information input fields 818a-818b (e.g., the user 820 may use a physical keyboard of the personal computer 812 to input the personal information 806a-806b into the personal information input fields 818a-818b). In an example, a virtualization input component 804 may be configured to display a save user interface element 830 (e.g., a web browser extension, a web browser application, etc.) within the shoe store webpage user interface 822 or through the tablet 802. In an example, responsive to the user 820 selecting the save user interface element 830, the visualization input component 804 may evaluate the shoe store webpage user interface 822 to identify personal information input fields 818a-818b and/or personal information 806a-806b. In an example, the personal information 806a-806b may be sent from the personal computer 812 to the tablet 802 through a connection 816 for storage within a data storage object 834.

Figure 9A:
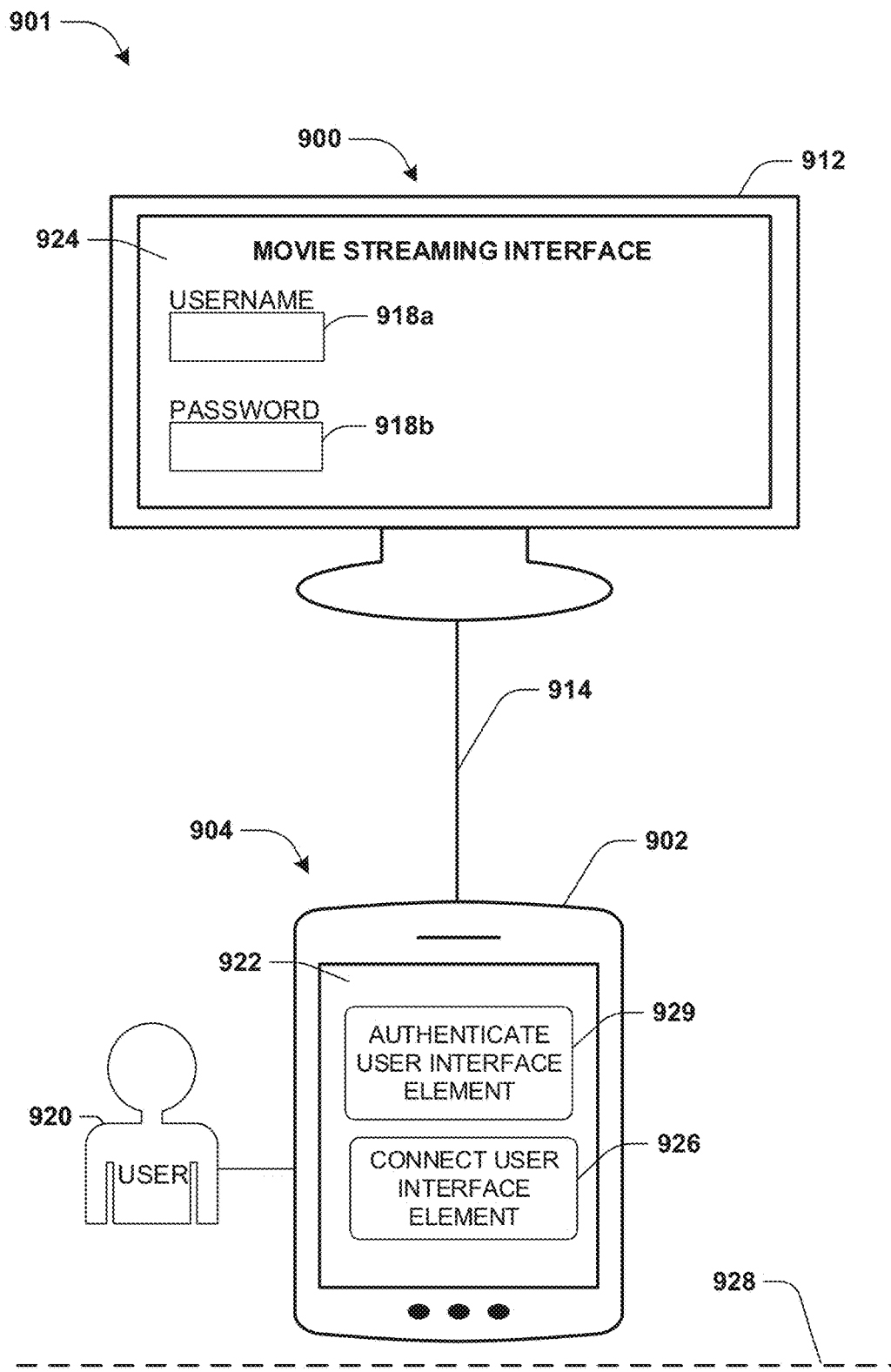
FIG. 9A is a component block diagram illustrating an example system for providing personal information from a first device to a second device, wherein a communication connection is formed based upon the first device being within a threshold distance of the second device.
Figure 9B:
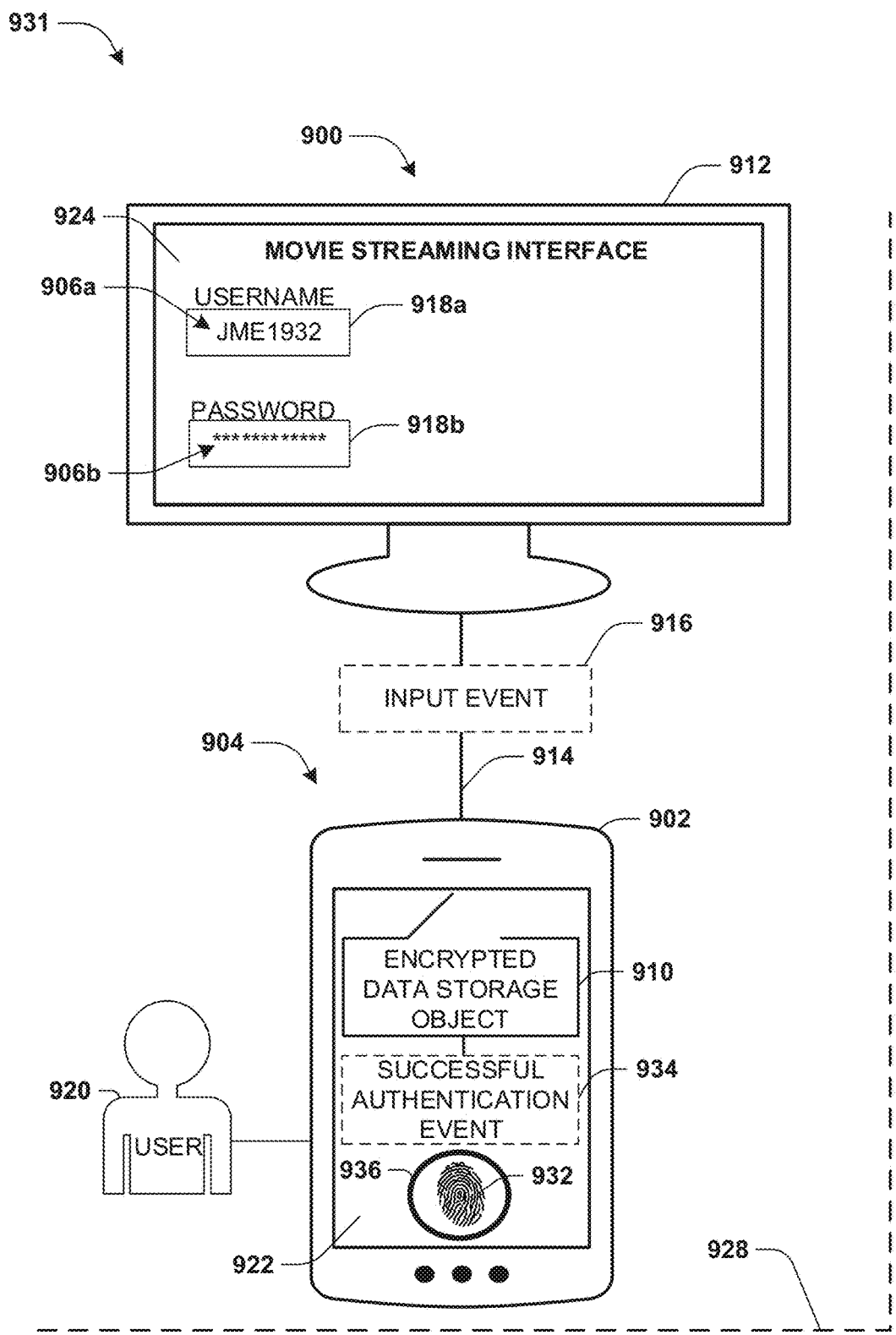
FIG. 9B is a component block diagram illustrating an example system for providing personal information from a first device to a second device, where a master authentication credential is successfully authenticated.
Figure 9C:
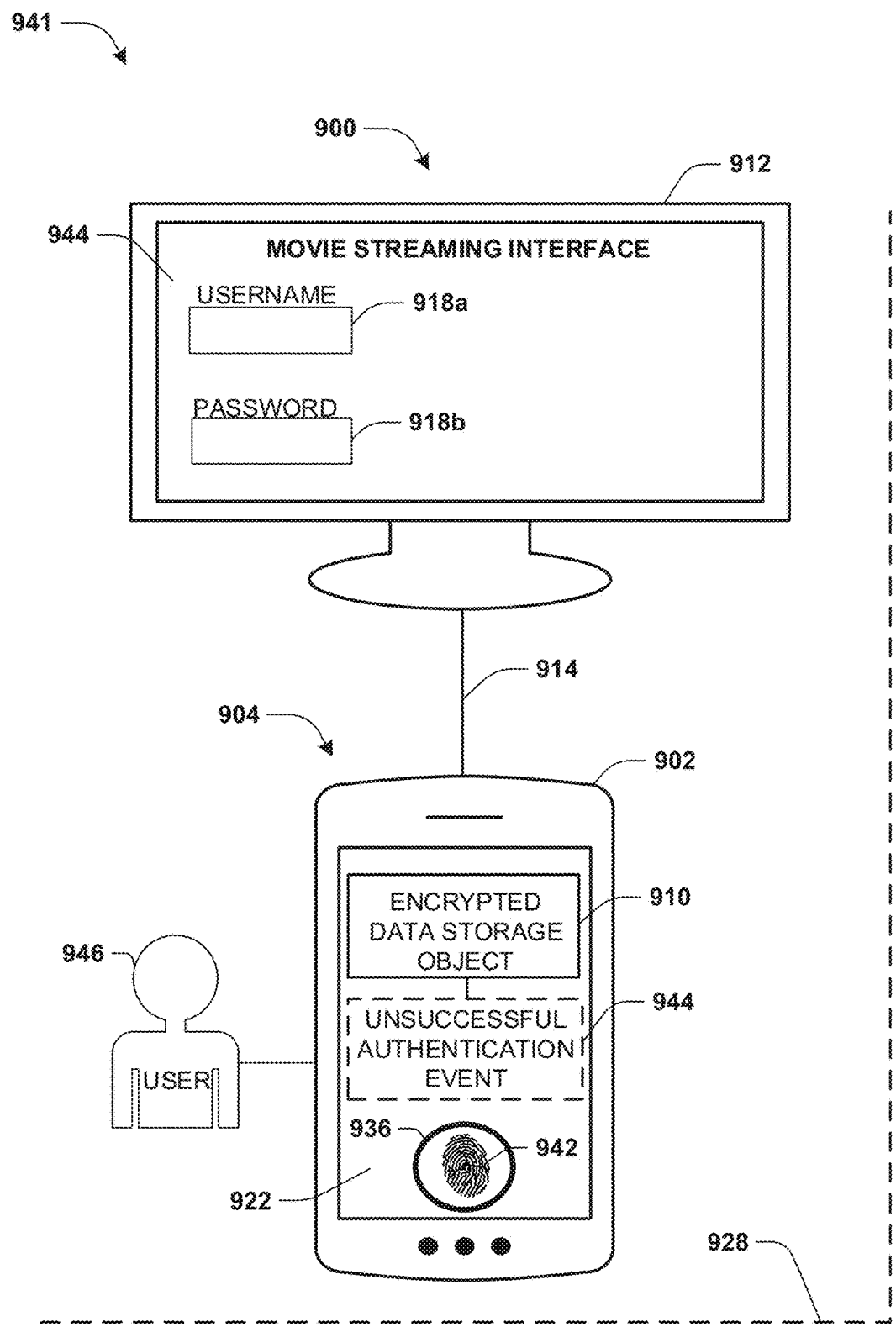
FIG. 9C is a component block diagram illustrating an example system for providing personal information from a first device to a second device, where a master authentication credential is not successfully authenticated.

FIGS. 9A-9C illustrate examples of a system 900 for providing personal information from a smartphone 902 to a smart television 912. FIG. 9A illustrates an example 901 of the system 900 where the smartphone 902 is within a threshold distance 928 of the smart television 912. In an example, responsive to the smartphone 902 being within the threshold distance 928, a virtualization input component 904 may be configured to display a connect user interface element 926 within a first user interface 922 displayed by the smartphone 902. Responsive to the user 920 selecting the connect user interface element 926, a communication connection 914 (e.g., a Bluetooth connection) may be established between the smartphone 902 and the smart television 912. In another example, the user 920 may configure the virtualization component 904 to automatically connect to the smart television 912 in response to the smartphone 902 being within the threshold distance 928 of the smart television 912. The virtualization component 904 may utilize the communication connection 914 to advertise the smartphone 902 as a virtualized input device to the smart television 912.

In an example, the user 920 may utilize the smartphone 902 to identify a username input field 918a and/or a password input field 918b within a movie streaming interface 924 displayed by the smart television 912. Responsive to identifying the username input field 918a and/or the password input field 918b, the virtualization input component 904 may display an authenticate user interface element 929 within the first user interface 922. In an example, the authentication user interface element 929 may prompt the user for a master authentication credential (e.g., a password credential, a fingerprint credential, a voice credential, etc.), which may be utilized to access personal information corresponding to the username input field 918a and/or the password input field 918b.

FIG. 9B illustrates an example 931 of the system 900 where an encrypted data storage object 910 may be accessed by providing the master authentication credential. In an example, the user 920 may provide a fingerprint credential 932 to the smartphone 902. In an example, the smartphone 902 may comprise a fingerprint scanner 936 utilized to authenticate the fingerprint credential 932 provided by the user 920. A successful authentication event 934 may be generated based upon the fingerprint credential 932 being successfully authenticated by the smartphone 902. Responsive to a successful authentication event 934 of the fingerprint credential 932, access into the encrypted data storage object 910 may be granted. In an example, personal information, such as a username 906a and/or a password 906b may be retrieved from the encrypted data storage object 910. The retrieval of the username 906a and/or the password 906b may comprise querying the encrypted data storage object 910 utilizing an optical content recognition result and/or a form field detection result for the username input field 918a and/or the password input field 918b. In an example, the virtualization input component 904 may generate an input event 916 comprising the username 906a and/or the password 906b. The input event 916 may invoke the smart television 912 to input the username 906a into the username input field 918a and/or the password 906b into the password input field 918b.

FIG. 9C illustrates an example 941 of the system 900 where access into the encrypted data storage object 910 may be denied based upon an unsuccessful authentication of the master authentication credential. In an example, a second user 946 may provide a second fingerprint credential 942 to the smartphone 902. An unsuccessful authentication event 944 may be generated based upon the second fingerprint credential 942 not being successfully authenticated by the smartphone 902. Responsive to an unsuccessful authentication event 944 of the fingerprint credential 942, access into the encrypted data storage object 910 may be denied. In an example, the fingerprint scanner 936 may be utilized to save the second fingerprint credential 942 in response to the unsuccessful authentication event 944. In another example, a camera of the smartphone 902 may be utilized to capture an image of the second user 946 in response to the unsuccessful authentication event 944. In another example, the personal information within the encrypted data object 910 may be erased in response to a set number of unsuccessful authentication events being generated (e.g., the personal information may be erased after one unsuccessful authentication attempt, after five unsuccessful authentications, etc.). In another example, a notification comprising locational information of the smartphone 902 may be sent to the user 920 in response to the unsuccessful authentication event 944. In an example, requesting master authentication credentials may reduce the likelihood of unauthorized access to the personal information of the user 920 in the event the second user 946 attempts to access personal information stored within the smartphone 902 (e.g., the master authentication credential may protect personal information if the smartphone 902 is stolen by the second user 946).

Figure 10:
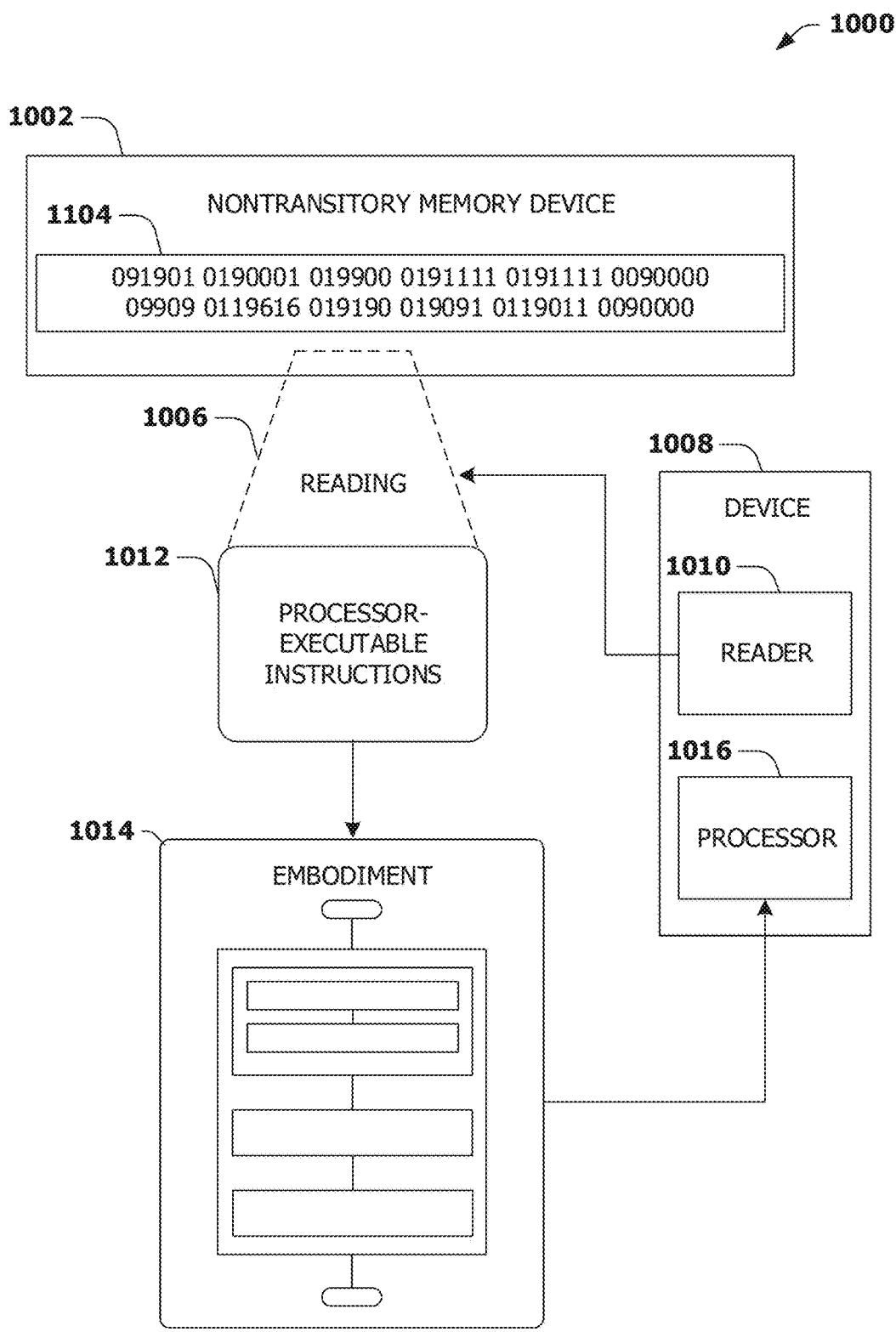
FIG. 10 is an illustration of a scenario featuring an example nontransitory memory device in accordance with one or more of the provisions set forth herein.

FIG. 10 is an illustration of a scenario 1000 involving an example nontransitory memory device 1002. The nontransitory memory device 1002 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 1002 stores computer-readable data 1004 that, when subjected to reading 1006 by a reader 1010 of a device 1008 (e.g., a read head of a hard disk drive, or a read operation invoked on a solid-state storage device), express processor-executable instructions 1012. In some embodiments, the processor-executable instructions, when executed on a processor 1016 of the device 1008, are configured to perform a method, such as at least some of the example method 400 of FIG. 4 and/or at least some of the example method 500 of FIG. 5, for example. In some embodiments, the processor-executable instructions, when executed on the processor 1016 of the device 1008, are configured to implement a system, such as at least some of the example system 600 of FIGS. 6A-6b, at least some of the example system 700 of FIGS. 7A-7C, at least some of example system 800 of FIG. 8, and/or at least some of example system 900 of FIGS. 9A-9C, for example.

3. Usage of Terms

As used in this application, "component," "module," "system," "interface," and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or." In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for providing personal information of a user from a first device to a second device, comprising:
a hardware processor; and
memory comprising processor-executable instructions that when executed by the hardware processor cause implementation of a virtualization input component, hosted by the first device, configured to:
establish a communication connection between the first device and the second device;
identify, on the first device, a user interface element within a user interface of the second device, wherein the first device is identified as a virtualized input device;
determine, based upon a text property of the user interface element, that the user interface element is a personal information input field identified for the personal information;
generate, on the first device, an input event comprising the personal information; and
send the input event from the first device to the second device in association with the user interface element, wherein the input event is configured to invoke the second device to fill in the personal information input field with the personal information.

2. The system of claim 1, the input event comprising a keyboard input of the personal information.

3. The system of claim 1, the communication connection comprising at least one of a Bluetooth connection, a Wi-Fi connection, a cellular communication connection, a near field connection, a radio frequency identification (RFID) connection or an inferred connection.

4. The system of claim 1, the input event comprising at least one of a mouse event or a tab event to move a cursor to the personal information input field.

5. The system of claim 1, the input event comprising a paste input of the personal information.

6. The system of claim 1, the virtualization input component configured to:
store the personal information within an encrypted data storage object hosted on the first device.

7. The system of claim 6, the encrypted data storage object comprising a plurality of personal information entries, and the virtualization input component configured to:
prompt the user for master authentication credentials; and
responsive to successfully authenticating the master authentication credentials, obtain access into the encrypted data storage object for retrieval of the personal information.

8. The system of claim 7, the virtualization input component configured to:
evaluate the user interface displayed by the second device to determine a context of the personal information input field; and
query the encrypted data storage object using the context to identify the personal information corresponding to the personal information input field.

9. The system of claim 1, the virtualization input component configured to:
obtain, on the first device, a screen capture of the user interface.

10. The system of claim 9, the virtualization input component configured to:
evaluate the screen capture to identify the user interface element.

11. The system of claim 9, the virtualization input component configured to at least one of:
evaluate the screen capture utilizing a form field detection technique to identify the user interface element within the user interface;
evaluate text of the screen capture utilizing optical character recognition to identify a context of the user interface element; or
identify the user interface element as the personal information input field based upon the context.

12. The system of claim 1, the virtualization input component configured to:
evaluate the user interface element within the user interface displayed by the second device to determine the text property for the user interface element;
prompt the user to provide a privacy setting for the personal information corresponding to the user interface element; and
store the text property, the privacy setting, and the personal information within an encrypted data storage object hosted on the first device.

13. A system for providing personal information of a user from a first device to a second device, comprising:
a hardware processor; and
memory comprising processor-executable instructions that when executed by the hardware processor cause implementation of a virtualization input component, hosted by the first device, configured to:
identify, on the first device, a user interface element within a user interface of the second device, wherein the first device is identified as a virtualized input device;
determine, based upon a text property of the user interface element, that the user interface element is a personal information input field identified for the personal information;
generate, on the first device, an input event comprising the personal information; and
send the input event from the first device to the second device in association with the user interface element, wherein the input event is configured to invoke the second device to fill in the personal information input field with the personal information.

14. The system of claim 13, the virtualization input component configured to:
evaluate a screen capture utilizing a form field detection technique to identify the user interface element within the user interface.

15. The system of claim 14, the virtualization input component configured to:
evaluate text of the screen capture utilizing optical character recognition to identify a context of the user interface element.

16. The system of claim 15, the virtualization input component configured to:
identify the user interface element as the personal information input field based upon the context.

17. The system of claim 13, the input event comprising at least one of a keyboard input or a paste input of the personal information.

18. The system of claim 13, the virtualization input component configured to:

establish a communication connection between the first device and the second device.

19. A method for providing personal information of a user from a first device to a second device, comprising:

establishing a communication connection between the first device and the second device;

identifying, on the first device comprising the personal information of the user, a user interface element within a user interface of the second device, wherein the first device is identified as a virtualized input device;

determining, based upon a text property of the user interface element, that the user interface element is a personal information input field identified for the personal information;

generating, on the first device, an input event comprising the personal information; and sending the input event from the first device to the second device in association with the user interface element, wherein the input event is configured to invoke the second device to fill in the personal information input field with the personal information, at least some of the method implemented via a hardware processor.

20. The method of claim 19, comprising:

identifying, on the first device, a second user interface element within the user interface of the second device; and responsive to the second user interface element having a visible text property and the personal information of the user having a non-display privacy setting, determining that the second user interface element is not the personal information input field for the personal information.

* * * * *